(12) United States Patent
Almkvist et al.

(10) Patent No.: US 10,458,070 B2
(45) Date of Patent: Oct. 29, 2019

(54) PRODUCTION OF SACK PAPER

(71) Applicant: BILLERUDKORSNÄS AB, Solna (SE)

(72) Inventors: Jonas Almkvist, Solna (SE); Ove Lindström, Solna (SE); Constantinos Xenopoulos, Solna (SE)

(73) Assignee: BILLERUDKORSNÄS AB, Solna (SE)

( * ) Notice: Subject to any disclaimer, the term of this patent is extended or adjusted under 35 U.S.C. 154(b) by 122 days.

(21) Appl. No.: 15/322,589

(22) PCT Filed: Jun. 24, 2015

(86) PCT No.: PCT/EP2015/064210
§ 371 (c)(1),
(2) Date: Dec. 28, 2016

(87) PCT Pub. No.: WO2016/001028
PCT Pub. Date: Jan. 7, 2016

(65) Prior Publication Data
US 2018/0202111 A1    Jul. 19, 2018

(30) Foreign Application Priority Data
Jul. 4, 2014    (EP) .................................. 14175729

(51) Int. Cl.
| | | |
|---|---|---|
| *D21H 27/10* | (2006.01) | |
| *D21H 17/28* | (2006.01) | |
| *D21H 17/29* | (2006.01) | |
| *D21H 17/44* | (2006.01) | |
| *D21H 19/20* | (2006.01) | |
| *D21H 19/44* | (2006.01) | |
| *D21H 19/82* | (2006.01) | |
| *D21H 21/16* | (2006.01) | |
| *D21H 21/18* | (2006.01) | |
| *B31F 1/12* | (2006.01) | |
| *C04B 28/04* | (2006.01) | |
| *C04B 40/00* | (2006.01) | |
| *D21H 19/40* | (2006.01) | |
| *B65D 30/24* | (2006.01) | |
| *B65D 30/08* | (2006.01) | |

(52) U.S. Cl.
CPC ............ *D21H 27/10* (2013.01); *B31F 1/126* (2013.01); *B65D 31/04* (2013.01); *B65D 31/14* (2013.01); *C04B 28/04* (2013.01); *C04B 40/0039* (2013.01); *D21H 17/28* (2013.01); *D21H 17/29* (2013.01); *D21H 17/44* (2013.01); *D21H 19/20* (2013.01); *D21H 19/40* (2013.01); *D21H 19/44* (2013.01); *D21H 19/82* (2013.01); *D21H 19/828* (2013.01); *D21H 21/16* (2013.01); *D21H 21/18* (2013.01); *Y02W 90/11* (2015.05)

(58) Field of Classification Search
CPC ........ D21H 27/10; D21H 17/28; D21H 19/20; D21H 19/82; D21H 17/29; D21H 17/44; D21H 19/40; D21H 19/44; D21H 19/828; D21H 21/16; D21H 21/18; D21H 11/04; D21H 27/30; B65D 31/04; B65D 31/14; C04B 28/04; C04B 40/0039; B31F 1/126; Y02W 90/11
See application file for complete search history.

(56) References Cited

U.S. PATENT DOCUMENTS

| | | | |
|---|---|---|---|
| 8,354,003 B2 * | 1/2013 | Virtanen | ................ D21H 17/68 162/158 |
| 8,851,752 B2 | 10/2014 | Wichmann | |
| 2005/0257909 A1 | 11/2005 | Lindgren et al. | |
| 2006/0260773 A1 * | 11/2006 | Tan | ........................ D21C 9/002 162/70 |
| 2010/0155005 A1 * | 6/2010 | Villa | ...................... D21H 11/14 162/146 |
| 2011/0061827 A1 * | 3/2011 | Virtanen | ................ D21H 17/68 162/181.3 |
| 2017/0130401 A1 * | 5/2017 | Almkvist | ............... B65D 31/02 |
| 2018/0202111 A1 * | 7/2018 | Almkvist | ............... B65D 31/04 |
| 2018/0230653 A1 * | 8/2018 | Avitsland | ............. D21H 25/005 |

FOREIGN PATENT DOCUMENTS

| | | | | |
|---|---|---|---|---|
| CA | 2951592 A1 * | 1/2016 | ............. | B65D 31/04 |
| EP | 2 399 836 A1 | 12/2011 | | |
| EP | 2963178 A1 * | 1/2016 | ............. | B65D 31/04 |
| JP | 2009-024288 A | 2/2009 | | |
| WO | 1998/041454 A1 | 9/1998 | | |
| WO | 1999/02772 A1 | 1/1999 | | |
| WO | 1999/002772 A1 | 1/1999 | | |
| WO | 2001/021893 A1 | 3/2001 | | |
| WO | 2008/031728 A1 | 3/2008 | | |
| WO | 2010/114467 A1 | 10/2010 | | |
| WO | 2011/000942 A1 | 1/2011 | | |
| WO | 2013/164646 A1 | 11/2013 | | |
| WO | WO-2016001028 A1 * | 1/2016 | ............. | B65D 31/04 |

OTHER PUBLICATIONS

Billerudkorsnäs, "Handbook for sack Kraft papers and paper sacks" pp. 1-32 (Year: 2014).*

(Continued)

*Primary Examiner* — Jose A Fortuna
(74) *Attorney, Agent, or Firm* — Amster, Rothstein & Ebenstein LLP

(57) ABSTRACT

There is provided a method of making white sack paper having a grammage of 50-140 g/m2 and a Gurley porosity (ISO 5636/5) of 2-10 s, comprising the steps of: a) providing bleached pulp, such as bleached sulphate pulp; b) subjecting the pulp to high consistency (HC) refining and optionally low consistency (LC) refining to the extent that the sack paper obtains the Gurley porosity; c) adding cationic polymer, such as cationic starch, to the pulp in an amount of 1.5-5.0 kg/ton paper; and d) adding size to the pulp in an amount of 0.4-2.0 kg/ton paper; and e) forming the sack paper from the pulp, wherein less than 2 kg/ton paper of anionic starch is added to the pulp.

15 Claims, No Drawings

(56) References Cited

OTHER PUBLICATIONS

State Intellectual Property Office of the P.R.C. "Office Action", issued in Chinese Patent Application No. 201580036513.0, which is a Japanese counterpart of U.S. Appl. No. 15/322,589, dated Jan. 2, 2018, 11 pages (3 pages of English Translation of Office Action and 8 pages of Office Action).
The International Bureau of WIPO, "Notification of Transmittal of Translation of the International Preliminary Report on Patentability," issued in International Application No. PCT/EP2015/064210 of which U.S. Appl. No. 15/322,589 is a U.S. national phase entry, dated Jun. 17, 2016, 14 pages.
International Search Report received for PCT Patent Application No. PCT/EP2015/064210 dated Sep. 10, 2015, 4 page.
European Patent Office, "Extended European Search Report," issued in European Patent Application No. 14 175 729.4, which is a European Counterpart of U.S. Appl. No. 15/322,589, dated Jan. 28, 2015, 8 pages.

\* cited by examiner

PRODUCTION OF SACK PAPER

TECHNICAL FIELD

The invention relates to production of sack paper.

BACKGROUND

During filling and storage of powdery material, such as cement, paper sacks are required to meet high standards.

Firstly, the paper sacks need to hold a considerable material weight, i.e. have high tensile strength. For this purpose, Kraft paper is a suitable sack wall material. The sacks typically have two or more walls, i.e. layers of paper material, to further strengthen the sack construction. A wall layer of a sack is often referred to as a ply. Production of ply material (i.e. sack paper) is for example disclosed in WO 99/02772.

Secondly, a material such as cement is sensitive to moisture contamination during storage. Hence, cement sacks often require a protection against atmospheric water vapor penetration through the sack plies. Such protection is often achieved by a moisture barrier incorporated as an intermediate layer in the sack, i.e. between two plies of the paper material. The moisture barrier is typically a plastic film ("free film"), e.g. of polyethylene (PE), that is impermeable to water. The free film may also improve resistance to grease and prevent contamination by microorganisms.

Thirdly, the paper sack should vent air during filling. In detail, the air that accompanies the powdered material shall efficiently vent from the sack as the filling machines that delivers the material run at high throughput rates. Often, the venting capability of the sack is the actual limiting for the filling rate. Efficient venting also prevents that air is trapped in the sack and causes under-weight packs, sack rupture and problems when sacks are stacked for transportation.

During the filling process, the only way for air to escape from the interior of the sack has, in many sack constructions, been through the walls of the sack. Kraft paper of high porosity is often used in the walls to facilitate air permeability. However, an increased porosity of the paper normally results in a decrease in the overall strength. In particular, the strength may be significantly reduced if holes must be made in the paper material to achieve sufficient air permeability. Furthermore, the use of a free film may reduce deaeration during filling, since most such films are impermeable to air. Therefore, the free film layers have been provided with slits or openings to facilitate deaeration.

Traditionally, construction workers have opened the cements sacks and added their contents to a mixer. However, some alternative solutions have been suggested.

GB2448486 discusses a dissolvable bag made from paper or another soluble materials, to contain building materials requiring mixing, such as cement, lime or plaster. It is stated that the dissolvable bag can be directly added to the mixer where the bag rapidly dissolves when water is added, which reduces spillage, wastage, mess and exposure to the building products. The packs are placed together in a waterproof wrapping to ensure the product stays dry whilst stored or in transit. However, no moisture barrier in the bags is discussed.

WO 2004052746 suggests spray or dip-coating the whole exterior of already filled bags with a non-permeable, waterproof coating. It is further suggested to place the bag in a mixer also containing a quantity of water, wherein resulting ingress of water into the bag causes a water-soluble inner layer of the bag to dissolve, thereby allowing the waterproof exterior of the bag to disintegrate within the mix. WO 2004052746 fails to device any materials for the inner and outer layer of the bag.

US 2011/0315272 states that a sack that dissolves in a moist environment can be obtained by using a dextrin adhesive for gluing the folded ends of the sack. Folding and gluing patterns for the ends are also discussed. A moisture barrier in the sack is not discussed.

JP5085565A suggests that a cement sack that can be added directly to a mixer is composed of a water soluble material, such as PVOH, having a thickness of 20-70 μm. FR2874598 discloses a similar solution.

SUMMARY

The present inventors have addressed the need for a disintegratable paper sack, i.e. a paper sack that can be added together with its contents, such as cement, to a mixer and then disintegrates in the mixer to such a degree that the product in the mixer is not markedly impaired.

Accordingly, it would not be necessary to open such a sack and empty its contents into the mixer. As the sacks are heavy and the contents dusty, the working environment of construction workers could be significantly improved.

Further, the inventors have realized that prior art sack papers, such as the sack paper of WO 99/02772 or BillerudKorsnäs' commercial sack paper QuickFill®, are not sufficiently disintergratable. In particular, the disintegratability in the cement mixer is insufficient if the prior art sack papers are coated.

It is thus an object of the present disclosure to provide a sack paper that, after being coated, converted to a sack, filled with contents and added to a cement mixer together with the contents and water, disintegrates in the cement mixer to such a degree that the desired properties of the product in the cement mixer are not significantly impaired.

The following itemized listing presents various embodiments of the present disclosure as well as their combinations.

1. A method of making white sack paper having a grammage of 50-140 $g/m^2$ and a Gurley porosity (ISO 5636/5) of 2-10 s, comprising the steps of:
   a) providing bleached pulp, such as bleached sulphate pulp;
   b) subjecting the pulp to high consistency (HC) refining and optionally low consistency (LC) refining to the extent that the sack paper obtains the Gurley porosity;
   c) adding cationic polymer, such as cationic starch, to the pulp in an amount of 1.5-5.0 kg/metric ton (hereinafter, "ton") paper, such as 2-4 kg/ton paper; and
   d) adding size to the pulp in an amount of 0.4-1.9 kg/ton paper, such as 0.5-1.5 kg/ton paper, such as 0.7-1.3 kg/ton paper; and
   e) forming the sack paper from the pulp,
   wherein less than 2 kg/ton paper, such as less than 1.0 kg/ton paper, of anionic starch is added to the pulp.
2. The method according to item 1, wherein substantially no anionic starch is added to the pulp.
3. The method according to item 1 or 2, wherein the energy supply in the HC refining is between 100 and 200 kWh per ton paper.
4. The method according to any one of items 1-3, wherein the energy supply of the LC refining is less than 50 kWh per ton paper, such as less than 30 kWh per ton paper, such as less than 20 kWh per ton paper.
5. The method according to item 4, wherein no LC refining is carried out.

6. The method according to any one of items 1-5, wherein the Cobb 60 S value (ISO 535) of at least one surface of the sack paper is at least 50 g/m², such as at least 60 g/m², such as at least 70 g/m², such as between 75 and 110 g/m².

7. The method according to any one of items 1-6, wherein the Gurley porosity of the sack paper is 4-10 s, such as 4-8 s, such as 4-7 s, such as 5-6.5 s.

8. The method according to any one of items 1-7, wherein the tensile energy absorption index (ISO 1924-3) of the paper is at least 1.8 J/g, such as at least 2 J/g, in both the machine direction (MD) and the cross direction (CD).

9. The method according to any one of items 1-8, wherein step e) comprises crêping.

10. The method according to any one of items 1-9, wherein the method further comprises the steps of:

f) applying a pre-coating composition onto the sack paper to form a pre-coating layer; and g) applying a barrier coating composition onto the pre-coating layer to form a barrier layer.

11. A white sack paper having a Gurley porosity (ISO 5636/5) of 2-10 s formed from bleached sulphate pulp to which:

cationic polymer, such as cationic starch, was added in an amount of 1.5-5.0 kg/ton paper, such as 2-4 kg/ton paper;

size was added in an amount of 0.4-2.0 kg/ton paper, such as 0.5-1.5 kg/ton paper, such as 0.7-1.3 kg/ton paper; and less than 2 kg/ton paper, such as less than 1 kg/ton paper, such as less than 0.5 kg/ton paper, of anionic starch was added.

12. The white sack paper according to item 11, wherein the Gurley porosity is 4-10 s, such as 4-8 s, such as 4-7 s, such as 5-6.5 s.

13. The white sack paper according to item 11 or 12, wherein the Cobb 60 S value (ISO 535) of at least one surface is least at least 50 g/m², such as at least 60 g/m², such as at least 70 g/m², such as between 75 and 110 g/m².

14. The white sack paper according to any one of items 11-13, wherein the tensile energy absorption index (ISO 1924/2) of at least 1.8 J/g, such as at least 2 J/g, such as at least 2.2 J/g, in both the machine direction (MD) and the cross direction (CD).

15. A multilayered paper material for use in a valve sack for a hydraulic binder, comprising a paper layer composed of the white sack paper according to any one of items 11-14 and a moisture barrier coating layer.

16. The multilayered paper material according to item 15, wherein a pre-coating layer comprising at least 50 wt. % (dry substance) of inorganic filler is provided between the paper layer and the moisture barrier coating layer.

17. A valve sack for a hydraulic binder, such as cement, comprising a ply composed of the sack paper according to any one of items 11-14.

18. A valve sack for a hydraulic binder, such as cement, comprising a ply composed of the multilayered paper material according to any one of items 15-16.

19. A multiple-ply valve sack for a hydraulic binder, such as cement, comprising an inner ply composed of the sack paper according to any one of items 11-14 and an outer ply composed of the multilayered paper material according to any one of items 15-16.

20. The sack according to any one of items 17-20, which is dimensioned to hold 20-60 kg of hydraulic binder.

21. The sack according to anyone of items 17-20 comprising a top end formed by folding and gluing the ply material, wherein a portion of the top end is not sealed by gluing such that air may escape through the non-sealed portion during filling of the sack with the hydraulic binder.

22. Use of a sack according to any one of items 17-21 to produce a hydraulic composition, such as concrete.

23. The use according to item 22, wherein the sack contains a hydraulic binder, aggregates and/or mineral additions.

24. A process for the production of a hydraulic composition comprising mixing water, aggregates and a hydraulic binder, wherein a sack according to any one of items 17-21 is used, which sack contains the hydraulic binder and optionally the aggregates.

DETAILED DESCRIPTION

As a first aspect of the present disclosure, there is provided a method of making white sack paper having a grammage (ISO 536) of 50-140 g/m² and a Gurley porosity (ISO 5636/5) of 2-10 s. The method comprises the steps of:

a) providing bleached pulp, such as bleached sulphate pulp;

b) subjecting the pulp to high consistency (HC) refining and optionally low consistency (LC) refining to the extent that the sack paper obtains the Gurley porosity;

c) adding cationic polymer, such as cationic starch, to the pulp in an amount of 1.5-5.0 kg/ton paper, such as 2-4 kg/ton paper; and d) adding size to the pulp in an amount of 0.4-2.0 kg/ton paper, such as 0.6-1.7 kg/ton paper, such as 0.8-1.3 kg/ton paper; and e) forming the sack paper from the pulp.

In the context of the present disclosure, "kg/ton paper" refers to kg per ton of dried paper from the paper making process. Such dried paper normally has a dry matter content (w/w) of 90-95%.

Likewise, "kWh per ton paper" (see below) refers to kWh per ton of dried paper from the paper making process.

Steps b), c) and d) can be performed in any order. Also, steps c) and d) may be divided into independent additions as long as the total amount stays within the defined ranges. Likewise, the refining(s) of step b) may divided into a plurality of sub-steps.

Preferably, HC refining is carried out first. If LC is employed, it is preferably carried out after the HC refining but before the additions of steps c) and d). If anionic starch is used, it is preferably added after the HC refining and the optional LC refining, but before steps c) and d). The size addition of step d) is preferably carried out before the cationic polymer addition of step c). If alum is used (see below), it is preferably added before steps c) and d), but after the HC refining, the optional LC refining and the optional anionic starch addition.

In another embodiment, a first portion of the cationic polymer is added before at least part of the size and a second portion of the cationic polymer is added after the at least part of the size.

In another embodiment, a first portion of the cationic polymer is added before an addition of anionic starch and a second portion of the cationic polymer is added after the addition of anionic starch.

Examples of the size added in step d) are rosin size, alkyl ketene dimer (AKD) and alkyl succinic anhydride (ASA).

In the method, less than 2 kg/ton paper, such as less than 1 kg/ton paper, such as less than 0.5 kg/ton paper, of anionic starch is added to the pulp. In one embodiment, no anionic starch is added. If added, the anionic starch of the present disclosure may for example have a degree of substitution (DS) of 0.030-0.100, such as 0.050-0.080.

The inventors have realized that bleaching of the pulp increases the disintegratability of the paper. Therefore, the sack paper of the present disclosure is white sack paper made from bleached pulp. To obtain sufficient strength, bleached sulphate (or "Kraft") pulp is preferred. The pulp of the present disclosure may for example comprise at least 50% softwood pulp, such as at least 75% softwood pulp, such as at least 90% softwood pulp. In one embodiment, the pulp of the present disclosure is softwood pulp. The grammage of the sack paper of the present disclosure is 50-140 g/m$^2$. Generally, it is preferred to add another paper ply in a sack instead of increasing the grammage above 140 g/m$^2$. Preferably, the grammage of the sack paper of the present disclosure is 50-130 g/m$^2$, such as 60-120 g/m$^2$, such as 60-110 g/m$^2$, such as 70-110 g/m$^2$.

The air resistance according to Gurley (ISO 5636/5) is a measurement of the time (s) taken for 100 ml of air to pass through a specified area of a paper sheet. Short time means highly porous paper.

The inventors have realized that porosity is an indicator of a paper's disintegratability. In turn, the degree of refining and/or beating of the bleached pulp is one factor controlling the porosity of the obtained white sack paper. In general, porosity decreases with increased refining. To improve disintegratability without impairing other properties, the inventors have found that high consistency (HC) refining and optionally low consistency (LC) refining of the bleached pulp shall be carried out to the extent that the obtained white paper has a Gurley porosity of 2-10 s, preferably 4-10 s, 4-8 s, 4-7 s or 5-6.5 s. In one embodiment, LC beating/refining is omitted.

In the production, the degree of refining may thus be optimized by carrying out refining to a certain degree and then measure the Gurley value of the obtained paper. If the Gurley value is below the target range (e.g. above 2-10 s or 5-6.5 s), the degree of refining is increased. If the Gurley value is above the target range, the degree of refining is decreased.

A Gurley value of 10 s or lower is also beneficial when the white sack paper of the present disclosure is uncoated, used for an inner or middle ply of a sack and should allow air penetration during filling.

HC refining is typically carried out at a fibre suspension consistency of 15% by weight or higher, such as 15%-40% by weight. LC refining is typically carried out at a fibre suspension consistency of 10% by weight or lower, such as 2%-10%.

Accordingly, in one embodiment of the method of the first aspect, no refining is carried out at a fibre suspension consistency below 10%.

Alternatively or as a complement, the degree of refining may be expressed as the amount of energy supplied in it. For example, the energy supply in the HC refining may be between 100 and 200 kWh per ton paper, such as between 100 and 160 kWh per ton paper, such as between 100 and 150 kWh per ton paper. Also, if LC refining is carried out, the energy supply in it may be below 50 kWh per ton paper, such as below 30 kWh per ton paper, such as below 20 kWh per ton paper.

As a configuration of the first aspect of the present disclosure, there is thus provided a method of making white sack paper having a grammage of 50-140 g/m$^2$, comprising the steps of:

a) providing bleached pulp, such as bleached sulphate pulp;
b) subjecting the pulp to high consistency (HC) refining and optionally low consistency (LC) refining, wherein the energy supply in the HC refining is between 100 and 200 kWh per ton paper and the energy supply in the LC refining is below 50 kWh per ton paper, such as below 30 kWh per ton paper, such as below 20 kWh;
c) adding cationic polymer, such as cationic starch, to the pulp in an amount of 1.5-5.0 kg/ton paper, such as 2-4 kg/ton paper; and
d) adding size, such as rosin size, to the pulp in an amount of 0.4-2.0 kg/ton paper, such as 0.5-1.5 kg/ton paper, such as 0.7-1.3 kg/ton paper; and
e) forming the sack paper from the pulp,
wherein less than 2 kg/ton paper, such as less than 1 kg/ton paper, such as less than 0.5 kg/ton, of anionic starch is added to the pulp. In one embodiment, no anionic starch is added.

Examples of the size added in step d) are rosin size, AKD and ASA.

The inventors have realized that high amounts of strengthening agents are not necessary for obtaining sufficient paper strength. In particular, the inventors have realized that when the pulp is bleached, the there is no need for addition of significant amounts of anionic starch. Also, adding only relatively low amounts of strengthening agents have been found to improve the disintegratability. For example, addition of 1.5-5.0 kg/ton paper of cationic starch as the only strengthening agent, results in a disintegratable paper of sufficient strength.

The cationic starch of the present disclosure may for example have a degree of substitution (DS) of 0.005-0.1, such as 0.02-0.08, such as 0.3-0.7, such as 0.05-0.65. The skilled person understands that if the cationic starch has a relatively low DS it may be necessary to add it in a relatively high amount, i.e. in an amount in the upper part of the range 1.5-5.0 kg/ton paper. The skilled person also understands that a higher charge may allow a lower amount. Provided with the teachings of the present disclosure, the skilled person is capable of finding the appropriate amount of a cationic starch product of a given DS without undue burden. For example, the amount may be 3.0-5.0 kg/ton paper if the DS is 0.005-0.4 and 1.5-4.0 kg/ton paper if the DS is 0.4-1.0.

Also, the addition of size to the pulp may be kept at a low level to improve disintegratability. For example, the added amount of size, such as rosin size, may be 0.5-1.5 kg/ton, such as 0.7-1.3 kg/ton.

Alum may also be added to the pulp, e.g. in an amount of 0.5-5 kg/ton paper. The addition of alum is particularly beneficial when the size is rosin size. Alum refers to hydrated potassium aluminium sulfate (potassium alum).

According to one embodiment, the total amount of strengthening agent, such as starch, added to the pulp is below 6 kg/ton. According to another embodiment, the total amount of strengthening agent and size added to the pulp is below 8 kg/ton, such as below 7 kg/ton.

The strengthening agent and the size may be added at any point in the process before the head box. Normally, the additions are made after the refining of step b). As mentioned above, the additions may be divided between different points.

Paper properties are often measured in the machine direction (MD) and in the cross direction (CD), since there may be significant differences in the properties, depending on the orientated fibre flow out of the headbox on the paper machine.

If the index of a certain property is needed, it should be calculated by dividing the actual value with the grammage for the paper in question.

The grammage (sometimes referred to as basis weight) is measured by weight and surface area.

The tensile strength is the maximum force that a paper will withstand before breaking. In the standard test ISO 1924-3, a stripe of 15 mm width and 100 mm length is used with a constant rate of elongation. The tensile strength is one parameter in the measurement of the tensile energy absorption (TEA). In the same test, the tensile strength, the stretch and the TEA value are obtained.

TEA is sometimes considered to be the paper property that best represents the relevant strength of the paper sack wall. This is supported by the correlation between TEA and drop tests. By dropping a sack the filling goods will move when reaching the floor. This movement means a strain on the sack wall. To withstand the strain, the TEA should be high, which means that a combination of high tensile strength and good stretch in the paper will then absorb the energy.

Crêping of the paper improves stretchability and thereby the TEA index. Accordingly, in one embodiment of the method of the present disclosure, step e) comprises crêping.

With the method of the present disclosure, it is possible to reach a tensile index for a coated or uncoated paper of above 60 kNm/kg (ISO 1924-3) in the machine direction (MD) and above 40 kNm/kg in the cross direction (CD) (see table 2 and 3). The tensile index of coated paper is typically lower as the added weight of the coating generally provides little extra tensile strength.

Further, it is possible to reach a tensile energy absorption index of above 2 J/g (ISO 1924-3) in both MD and CD (see tables 2 and 3).

In embodiments of the present disclosure, the tensile energy absorption index (ISO 1924-3) of the white sack paper may be at least 1.8 J/g, such as at least 2 J/g, such as at least 2.2 J/g, in both the machine direction (MD) and the cross direction (CD). Further, tensile index for a coated or uncoated white sack paper of the present disclosure may for example be at least 50 kNm/kg (ISO 1924-3), such as at least 55 kNm/kg, in the machine direction (MD) and at least 35 kNm/kg, such as at least 40 kNm/kg, in the cross direction (CD).

The Cobb value (ISO 535) represents the amount of water absorbed by a paper surface in a given time. The most commonly employed Cobb value is Cobb 60, wherein the time is 60 sec. The inventors have found that higher Cobb values generally correlates with better disintegratability. Higher Cobb values may for example be obtained by delignifying/bleaching the pulp and/or reducing the amount of size added to the pulp (see above).

For uncoated white sack paper according to the present disclosure, the Cobb 60 value of both surfaces is preferably at least 50 g/m$^2$, such as at least 60 g/m$^2$, such as at least 65 g/m$^2$. Further, it is preferred that at least one surface of the uncoated white sack paper according to the present disclosure has a Cobb 60 value of at least 65 g/m$^2$, such as at least 70 g/m$^2$, such as between 75 and 110 g/m$^2$.

For coated white sack paper (i.e. white sack paper having one coated surface) according to the present disclosure, the Cobb 60 value of the uncoated surface is preferably at least 50 g/m2, such as at least 60 g/m$^2$, such as at least 70 g/m$^2$, such as between 75 and 110 g/m$^2$. Further, the Cobb 60 value of the coated surface of coated white sack paper is preferably as at least 35 g/m$^2$, such as at least 40 g/m$^2$, such as at least 45 g/m$^2$.

As discussed below, the white sack paper of the present disclosure may be coated in two steps. Accordingly, one embodiment of the present disclosure further comprises the steps of:

f) applying a pre-coating composition onto the sack paper to form a pre-coating layer; and g) applying a barrier coating composition onto the pre-coating layer to form a barrier layer.

The sack paper obtained by the process of the present disclosure has a unique combination of properties. As a second aspect of the present disclosure, it is therefore provided a white sack paper, such as white sack Kraft paper, having a Gurley porosity (ISO 5636/5) of 2-10 s and comprising cationic polymer (such as cationic starch), size (such as rosin size) and optionally anionic starch. The white sack paper of the second aspect is formed from bleached pulp, such as bleached sulphate pulp.

In a preferred embodiment, the white sack paper of the second aspect is formed from a bleached pulp to which:
cationic polymer, such as cationic starch, was added in an amount of 1.5-5.0 kg/ton paper, such as 2-4 kg/ton paper;
size was added in an amount of 0.4-2.0 kg/ton paper, such as 0.5-1.5 kg/ton paper, such as 0.7-1.3 kg/ton paper; and
less than 2 kg/ton paper, such as less than 1 kg/ton paper, such as less than 0.5 kg/ton paper, of anionic starch was added.

The various embodiments described above under the first aspect apply mutatis mutandis to the white sack paper of the second aspect.

The inventors have realized that disintegratable sacks cannot have a polyethylene free film as such a film fails to sufficiently disintegrate in the mixer. The inventors have concluded that the moisture barrier should instead be provided by a coating on at least one of the paper plies, preferably the outermost ply, of the sack.

Accordingly, the white sack paper of the present disclosure may be provided with a moisture barrier coating. Various moisture barriers are known to the skilled person. In one embodiment, a precoating layer comprising at least 50 wt. % (dry substance) inorganic filler is provided between the paper layer and the moisture barrier coating. Preferably, the precoating layer comprises at least 70 wt. % inorganic filler. Such a precoating layer prevents penetration of the moisture barrier into the paper and thereby improves the disintegratability of the coated paper and reduces the amount of barrier chemicals needed to obtain sufficient barrier properties.

The coat weight of the precoating may be 5-12 g/m$^2$ and the coat weight of the barrier coating may be 5-15 g/m$^2$.

The moisture barrier properties may be considered to be sufficient when the water vapor transmission rate (WVTR, ISO 2528) is less than 1400 g/m$^2$*24 h, preferably less than 1200 g/m$^2$*24 h. For example, the WVTR of coated white sack paper of the second aspect may be 700-1200 g/m$^2$*24 h.

There is also provided a valve sack for a hydraulic binder, such as cement, comprising at least one ply composed of the white sack paper of the second aspect. In a multiple-ply valve sack, the outermost ply is preferably composed of the coated paper of the second aspect, while the other ply/plies is/are composed of an uncoated paper and highly permeable to air.

From an economical perspective, it may be preferred to use the same type of paper in the inner and the outer plies of a sack, with the only difference that the outer ply is coated. Accordingly, all the paper needed for a sack may be produced with a single paper making process. Then, the paper intended for the outer ply of the sack is coated to obtain the moisture barrier.

The valve sack may thus comprise an inner ply composed of the uncoated sack paper of the second aspect, while an outer ply of the sack is composed of the same paper material provided with a barrier coating.

In a multiple-ply valve sack, each ply may have a grammage of 50-100 g/m², such as 60-90 g/m².

The sack is typically a "25 kg sack", a "35 kg sack" or a "50 kg sack", which are the sack sizes most frequently used in the field. The skilled person is thus well aware of suitable dimensions of a 25 kg, 35 kg or 50 kg sack. However, the sack may also be dimensioned for any weight in the range of 10-100 kg. In one embodiment, the sack may is dimensioned to hold 20-60 kg of hydraulic binder, such as cement.

The volume of the sack may for example be in the range of 10-60 liters. The volume of a "25 kg sack" is typically about 17.4 liters. The dimensions of a filled 25 kg sack may for example be 400×450×110 mm. The volume of a "50 kg sack" is typically about 35 liters.

In the sacks of the present disclosure, the coated side of an outer ply, such as the outermost ply, may be facing inwards or outwards. A benefit of arranging the outer or outermost ply such that the coated side is facing inwards is the facilitation of an efficient gluing. It is generally easier to glue two uncoated surfaces to each other. Another benefit of such an orientation is that the barrier is protected from damage. A benefit of arranging the outermost ply such that the coated side is facing outwards is that the coating may provide protection against rain.

One embodiment of the sack of the present disclosure comprises a top end formed by folding and gluing the ply material such that a portion of the top end is not sealed by the gluing. In such an embodiment, the folding and gluing is such that air may escape through the non-sealed portion during filling of the sack with the hydraulic binder. Preferably, the sack is designed such that air penetrates the innermost ply and then escapes through the non-sealed portion during filling at high throughput rates.

As a third aspect of the present disclosure, there is provided a use of a sack according to the above to produce a hydraulic composition. In an embodiment of the third aspect, the sack contains a hydraulic binder and/or aggregates. The sack may also contain mineral additions.

A hydraulic composition generally comprises a hydraulic binder, water, aggregates and admixtures. The aggregates include coarse aggregates and/or sand. They may be a mineral or organic material. They may also be of wood or recycled materials or with a base of waste material. A sand is generally an aggregate having a particle size less than or equal to 4 mm. Coarse aggregates are generally aggregates having a particle size greater than 4 to, for example, 20 mm.

A hydraulic binder comprises any compound which sets and hardens by hydration reactions. The hydraulic binder comprises, for example cement, plaster or hydraulic lime. Preferably, the hydraulic binder is a cement.

Accordingly, the sack according to the third aspect preferably contains a hydraulic binder, such as cement, aggregates and/or mineral additions.

The sack used according to the third aspect is generally a sack of a material that is sufficiently resistant to make it possible to fill the sack with a particulate material, to handle and transport the filled sack, and at the same time have a nature and a structure such that it dissolves, disperses or disintegrates in water, preferably rapidly, during the production of a hydraulic composition. Preferably, the sack dissolves, disperses or disintegrates in water by the effect of mechanical mixing. The difference between the solubility and the dispersibility is that, in the latter case, small pieces of the sack remain intact (for example particles or fibres), but without having a significant negative effect when the hydraulic composition is used. A disintegratable sack is generally made of a material which loses its cohesion during the mixing.

Preferably, the sack of the present disclosure comprises one or more characteristics selected from the following list:
  sufficient mechanical properties to contain 5 to 50 kg of particulate materials;
  cold disintegration (no heating required for the disintegration);
  disintegration by the effect of a mixing action; and
  sufficient impermeability to gases, for example to oxygen in the air and to carbon dioxide. This impermeability is in particular important during storage of the sacks, reducing to a minimum the ageing of the particulate materials contained in the sack.

Preferably, the sack has all the characteristics listed above.

Preferably, the sack of the third aspect is disintegrated in less than 70 revolutions of the blade in a concrete mixer.

Preferably, at least 80% by mass of the sack is disintegrated in the concrete mixer in 10 minutes or less, such as 6 minutes or less.

Similar to the third aspect, there is provided a process for the production of a hydraulic composition comprising mixing water, aggregates and a hydraulic binder, wherein a sack according to the above, which contains the hydraulic binder and/or the aggregates, is used.

The process for the production of the hydraulic composition may for example comprise the following steps:
  a. introduction of water and aggregates in a concrete mixer;
  b. introduction of a hydraulic binder; and
  c. optionally introduction of mineral additions and/or other admixtures; in which the sack is introduced during step a and/or during step b and/or during step c, wherein the sack is obtained according to the process as described herein above.

In one embodiment, at least one part of the aggregates in step a and/or at least one part of the hydraulic binder in step b and/or at least one part of the mineral additions in step c is contained in the sack.

According to a further embodiment, a disintegratable sack is added during step a. Preferably, at least one part of the aggregates in step a is contained in the disintegratable sack. Preferably, the totality of the aggregates in step a is contained in the disintegratable sack.

According to a further embodiment, a disintegratable sack is added during step b. At least one part of the hydraulic binder in step b is preferably contained in the disintegratable sack. Preferably, the totality of the hydraulic binder in step b is contained in the disintegratable sack.

According to a further embodiment, a disintegratable sack is added during step c. At least one part of the mineral additions in step c is preferably contained in the disintegratable sack. Preferably, the totality of the mineral additions in step c is contained in the disintegratable sack.

According to a further embodiment, a disintegratable sack is added during step a and during step b.

According to a further embodiment, a disintegratable sack is added during step a and during step c.

According to a further embodiment, a disintegratable sack is added during step b and during step c.

According to a further embodiment, a disintegratable sack is added during step a, during step b and during step c.

The hydraulic composition obtained by the process makes it possible to produce elements for the construction field.

Shaped articles for the construction field generally comprise any constituting element of a construction, for example a floor, a screed, a foundation, a wall, a partition wall, a ceiling, a beam, a work top, a pillar, a bridge pier, a concrete block, a pipeline, a post, a cornice, an element of road works (for example a border of a pavement), a tile, for example a roof tile, a surfacing (for example of a wall), a plaster board, an (acoustic and/or thermal) insulating element.

Preferably, the contents of the sack of the present disclosure comprise a particulate material, more preferably a hydraulic binder, aggregates or a mineral addition, most preferably a hydraulic binder. According to an embodiment, the contents of the sack may be a hydraulic binder and/or aggregates and/or a mineral addition.

A hydraulic composition is generally a mix of a hydraulic binder, with water (called mixing water), optionally aggregates, optionally additives, and optionally mineral additions. A hydraulic composition may for example be a high performance concrete, very high performance concrete, self-placing concrete, self-levelling concrete, self-compacting concrete, fibre concrete, ready-mix concrete, pervious concrete, insulating concrete, accelerated concrete or coloured concrete. The term "concrete" also comprises concretes which have been submitted to a finishing operation, for example bush-hammered concrete, exposed or washed concrete or polished concrete. Pre-stressed concrete is also covered by the definition. The term "concrete" further comprises mortars. In this specific case "concrete" may refer to a mix of a hydraulic binder, sand, water, optionally additives and optionally mineral additions. The term "concrete" comprises fresh concrete or hardened concrete. Preferably, the hydraulic composition according to the present disclosure is a cement slurry, a mortar, a concrete, a plaster paste or a slurry of hydraulic lime. More preferably, the hydraulic composition is selected from a cement slurry, a mortar or a concrete. The hydraulic composition may be used directly on jobsites in the fresh state and poured into formwork adapted to the target application, or at a pre-cast plant, or used as a coating on a solid support.

The mineral additions are generally finely divided materials used in the hydraulic compositions (for example, concrete) of the hydraulic binders (for example, a cement) in order to improve certain properties or to provide them with particular properties. They may be, for example, fly ash (for example, as defined in the «Cement» NF EN 197-1 Standard, paragraph 5.2.4 or as defined in the EN 450«Concrete» Standard), pozzolanic materials (for example, as defined in the «Cement» NF EN 197-1 Standard of February 2001, paragraph 5.2.3), silica fume (for example, as defined in the «Cement» NF EN 197-1 Standard, of February 2001, paragraph 5.2.7 or as defined in the prEN 13263«Concrete» Standard: 1998 or the NF P 18-502 Standard), slag (for example, as defined in the «Cement» NF EN 197-1 Standard, paragraph 5.2.2 or as defined in the NF P 18-506«Concrete» Standard), calcined shale (for example, as defined in the «Cement» NF EN 197-1 Standard, of February 2001, paragraph 5.2.5), limestone additions (for example, as defined in the «Cement» NF EN 197-1 Standard, paragraph 5.2.6 or as defined in the NF P 18-508«Concrete» Standard) and siliceous additions (for example, as defined in the NF P 18-509«Concrete» Standard) or mixtures thereof.

EXAMPLES

Example 1

Various pulp compositions were prepared according to table 1 and paper was formed. The properties of uncoated and coated paper are presented in tables 2 and 3, respectively.

In all trials of table 1, crêping was carried out.

In trial 7, the pulp was obtained from softwood, about 3.5 kg/ton alum was added to the pulp/furnish, pH of the pulp/furnish was about 5.7 in the head box and the consistency of the pulp/furnish was in the range of 0.2-0.4 in the head box.

TABLE 1

Production of various paper qualities having a grammage of 80 g/m².

| Trial | Type of sulphate pulp | HC refining (kWh per ton paper) | LC refining (kWh per ton paper) | Cationic starch (kg per ton paper) | Anionic starch (kg per ton paper) | Rosin size (kg per ton paper) |
|---|---|---|---|---|---|---|
| 1 | Unbleached | 240 | 60 | 5 | 0 | 0.8 |
| 2 | Unbleached | 230 | 48 | 6.1 | 0 | 0.8 |
| 3 | Bleached | 179 | 30.2 | 7.1 | 2.9 | 2.1 |
| 4 | Bleached | 179 | 31.3 | 3.5 | 1.5 | ~1.4 |
| 5* | Bleached | 180 | 32.9 | 3.5 | 1.5 | 2.5 |
| 6 | Bleached | 156 | 14.3 | 3.5 | 1.5 | 1.3 |
| 7 | Bleached | 125 | 11.6 | 3.0 | 0 | 1.0 |

*The grammage was 90 g/m²

TABLE 2

Properties of various uncoated paper qualities having a grammage of 80 g/m².

| Sample | Gurley (s) | Tensile index [MD/CD] (kNm/kg) | TEA index [MD/CD] (J/g) | Cobb 60 s [Top Side/Wire side] (g/m²) | Disintegratability test 1 (%) | Disintegratability test 2 (%) |
|---|---|---|---|---|---|---|
| Trial 1 | 15 | 104/60 | 1.7/3.0 | 28/26 | 50 | N/A |
| Trial 2 | 10 | 80/70 | 3.0/3.1 | 28/26 | 56 | N/A |
| Trial 3 | 5 | 70/52 | 2.6/3.1 | 30/28 | 96 | 85 |
| Trial 4 | 5.5 | 69/52 | 2.3/3.0 | 48/56 | 99 | 94 |
| Trial 5* | 5.5 | 65/49 | 2.3/2.8 | 34/43 | 99 | 89 |
| Trial 6 | 5.9 | 68/47 | 2.4/2.8 | 54/61 | 100 | 90 |
| Trial 7 | 5.9 | 66/48 | 2.4/3.0 | 91/90 | 100 | 95 |
| Mondi# | 5.9 | 84/64 | 3.3/3.7 | 28/27 | 32 | N/A |

*The grammage was 90 g/m²
Brown sack paper (80 g/m²) from Mondi

TABLE 3

Properties of various coated paper qualities. The paper of trial 4 is coated with a single layer (15 g/m²) of moisture barrier. The paper of trial 5 is coated with two layers (6 + 6 g/m²) of a moisture barrier comprising latex and a platy clay. The paper of trial 6 is coated with a pre-coating layer (9 g/m²) comprising filler and binder and a moisture barrier coating layer (5 g/m²) comprising latex and the platy clay. The paper of trial 7 is coated with a pre-coating layer (9 g/m²) comprising filler and binder and a moisture barrier coating layer (9 g/m²) comprising latex and the platy clay.

| Sample | Tensile index [MD/CD] (kNm/kg) | TEA index [MD/CD] (J/g) | Cobb 60 s [uncoated side/coated side] (g/m²) | Disintegratability test 1 (%) | Disintegratability test 2 (%) |
|---|---|---|---|---|---|
| Trial 4 95 g/m² | 72/47 | 2.2/2.6 | 29/24 | 84 | 80 |
| Trial 5 102 g/m² | 70/49 | 2.2/2.7 | 26/20 | 81 | 68 |
| Trial 6 94 g/m² | 75/44 | 2.2/2.6 | 40/39 | 90 | 89 |
| Trial 7 98 g/m² | 68/40 | 2.2/2.4 | 82/46 | 99 | 95 |

Disintegratability test 1 was carried out according to the following protocol:
1. Tear paper (dry weight 30.0 g) into pieces of about 1.5 cm×1.5 cm and add them to 2 l of water;
2. After 2 minutes, add the paper-water mixture to a laboratory defibrator (L&W);
3. Run 5000 revolutions;
4. Add the contents from the defibrator to a laboratory sieve equipment having sieve openings of 0.15 mm;
5. After completed filtration, collect the retentate;
6. Dry the retentate at 105° C.;
7. Weigh the dried retentate;
8. Calculate the disintegratability (%) using the formula ((30−w)/30)*100, wherein w is the weight (g) of the dried retentate.

Disintegratability test 2 was carried out according to the following protocol:
1. Introduction of the aggregates (coarse first, then fine) in bell (concrete) 350 L mixer.
2. Add pre-wetting water (6% of the overall amount) in the space for 30 seconds.
3. Mix for 30 seconds at normal speed and no more than a 45-degree inclination (ideally 20-30 degrees).
4. Pause mixing for 4 minutes for pre-wetting to occur.
5. Add 25 kg cement sack whole in the mixer cavity and mix for 1 minute.
6. Add remaining water over a period of 30 seconds.
7. Mix for 6 minutes.
8. After the end of the mixing, the pass the whole load through a sieve with a mesh size of 4 mm. The passage of the material through the mesh is aided with the use of a water spray, which dilutes and disperses the mixture. Collect the paper that is visible after all the fines have passed the sieve.
9. Put the collected paper in a finer sieve which is itself placed in a container of a similar, slightly bigger size. Add enough water to the container to immerse the collected paper, thus removing cement and other fines previously trapped on it surface. This washing by immersion and whirling action is repeated 3-4 times until the paper is visibly free of foreign material.
9. Dry the washed paper in an oven set at 40° C. for a period of 24 hours.
10. Calculate the disintegratability (%) using the formula ((w1−w2)/w1)*100, wherein w1 is the initial weight of the sack and w2 is the weight of the paper from step 9.

For both uncoated and coated paper, the disintegratability is preferably at least 99% according to test 1. Sometimes, 100% disintegratability according to test 1 is required.

According to customer requirements, the disintegratability according to test 2 shall be at least 90%, preferably at least 95%.

Example 2

In example 2, sacks containing the formulations of table 4 were employed.

"Sack I" comprised two paper plies and had a capacity of 25 kg (400×450×110 mm). The outer ply was composed of the coated paper of Trial 7 in table 3 above. The inner ply was composed of the uncoated paper of Trial 7 in table 2 above.

"Sack II" had a capacity of 35 kg (460×520×115/130 mm) and comprised an inner and an outer ply composed of the same papers as Sack I.

"Sack III" comprised two paper plies and had a capacity of 25 kg (400×450×110 mm). The outer ply was composed of the paper of Trial 3 in table 2 above coated with a barrier layer (8 g/m²) comprising clay and latex (no precoating). The inner ply was composed of the uncoated paper of Trial 3 in table 2 above.

TABLE 4

Formulations of mortar or concrete.

| | Quantities in kg | | | |
|---|---|---|---|---|
| | Mortar | | | Concrete |
| | A | B | C | D |
| Mix volume (Liters) | 45 | 63 | 45 | 117 |
| CEM I, 52.5N (Saint-Pierre La Cour) | 25 | 35 | | 35 |
| CEM I 52.5N CE CP2 NF Blanc (Le Teil) | | | 25 | |
| Sand 0/1R (St Bonnet) | 24.1 | 33.8 | 24.1 | 46.9 |
| Sand 1/5R (St Bonnet) | 27.4 | 38.4 | 27.4 | 53.2 |
| Corrector sand 0/0.315 (Fulchiron PE2 LS) | 5 | 7 | 5 | 9.74 |
| Coarse aggregate 5/10R (St Bonnet) | | | | 22.5 |
| Coarse aggregate 10/20R (St Bonnet) | | | | 84.7 |
| Water (pre-wetting) | 3.39 | 4.75 | 3.39 | 8.73 |
| Water (gauging) | 7.25 | 10.5 | 7.25 | 12.6 |

Concrete and mortar was produced according to the following protocol:
1. Introduction of the aggregates (coarse first, then fine) in bell (concrete) 350 L mixer;
2. Add pre-wetting water (6% of the overall aggregate amount) over a period of 30 seconds;
3. Mix for 30 seconds at normal speed (24 RPM) and no more than a 45-degree inclination (ideally 20 to 30 degrees);
4. Pause mixing for 4 minutes for pre-wetting to occur;
5. Add 25 kg cement sack whole in the mixer cavity and mix for 1 minute;
6. Add remaining water over a period of 30 seconds;
7. Mix for a period of time (the "wet mixing" time) ranging from 3 to 9 minutes.
8. Stop, transfer the concrete from the mixer and conduct the testing.

Disintegratability performance variation with mix design, sack type and mixing time was examined. The results are shown in table 5.

TABLE 5

Disintegratability performance

| Formulation | Sack mixed into formulation | Wet mixing time in production step 7 | Disintegratability test 2 (%) |
|---|---|---|---|
| A (mortar) | Sack I, 25 kg | 6 min | 95 |
| B (mortar) | Sack II, 35 kg | 6 min | 93 |
| D (concrete) | Sack II, 35 kg | 6 min | 99.5 |
| A (mortar) | Sack III, 25 kg | 3 min | 54.1 |
| A (mortar) | Sack III, 25 kg | 6 min | 84.3 |
| A (mortar) | Sack III, 25 kg | 9 min | 88.2 |

The importance of sack type is illustrated by comparing the performance of sacks I and III at equivalent mixing times (6 minutes) in table 5.

Performance during a period of ageing in exterior storage was also examined.

Ageing was carried out on entire sacks filled at the cement plant using a Rotopacker filling machine (Haver and Boecker). The filled sacks were placed on pallets that were subsequently covered with a polyethylene film (hood). The pallets were transferred to the testing site and placed in an open-air setting under a horizontal cover (roof) to prevent direct exposure to the weather. The climatic conditions to which the sacks were exposed are given in the table 6.

TABLE 6

Climatic conditions of ageing test

| Week | T (° C.) Weekly average | T (° C.) Hourly max | T (° C.) Hourly min | RH (%) Weekly average | RH (%) Hourly max | RH (%) Hourly min |
|---|---|---|---|---|---|---|
| 1 | 13.6 | 22.8 | 5.6 | 79.4 | 93.8 | 56.8 |
| 4 | 3.7 | 8.2 | 0.3 | 87.1 | 93.5 | 74.8 |
| 5 | 0.5 | 5.5 | −6.4 | 81.2 | 92.8 | 60.3 |
| 6 | 0.2 | 7.0 | −5.8 | 87.2 | 92.8 | 69.5 |
| 7 | −0.7 | 10.3 | −6.1 | 91.3 | 97.0 | 66.5 |
| 8 | 8.2 | 14.6 | 1.5 | 81.6 | 94.0 | 41.3 |
| 9 | 7.8 | 14.8 | −1.8 | 80.4 | 94.0 | 52.3 |
| 10 | 7.1 | 11.8 | −0.7 | 84.4 | 95.0 | 64.0 |
| 11 | 9.2 | 14.9 | 2.1 | 79.6 | 95.0 | 49.0 |
| 12 | 6.2 | 11.1 | −1.2 | 87.4 | 95.0 | 59.5 |
| 13 | 3.8 | 8.3 | −4.0 | 88.3 | 94.0 | 71.3 |
| 14 | 4.5 | 8.1 | −0.7 | 83.2 | 94.0 | 58.5 |
| 15 | 6.4 | 12.3 | −2.2 | 78.3 | 93.8 | 46.8 |
| 16 | 7.4 | 16.2 | 0.2 | 78.8 | 94.0 | 50.3 |
| 17 | 7.1 | 14.1 | −0.9 | 80.2 | 94.0 | 50.5 |
| 18 | 6.5 | 14.4 | 1.3 | 79.3 | 93.8 | 42.8 |
| 19 | 7.2 | 19.3 | −1.2 | 74.1 | 93.0 | 33.8 |
| 20 | 8.9 | 17.7 | 0.7 | 76.5 | 94.0 | 47.5 |
| 21 | 11.0 | 23.0 | 1.9 | 73.5 | 94.3 | 36.3 |
| 22 | 8.5 | 18.5 | −0.2 | 68.4 | 93.0 | 34.5 |
| 23 | 13.5 | 20.0 | 5.2 | 70.4 | 92.8 | 44.3 |
| 24 | 13.6 | 24.0 | 2.8 | 67.1 | 94.0 | 31.8 |
| 25 | 9.8 | 18.9 | 0.0 | 66.2 | 92.0 | 34.0 |

The sampling method that corresponds to the study of ageing is as follows: The sampling periods were defined as 0, 4, 8, 13 and 25 weeks. At the end of each period, two sacks were taken for testing. One sack was directly used for concrete or mortar production and the associated tests in the fresh and hardened state (i.e. slump, air content, setting time, compressive and flexural strength). The second sack was opened with care in order to preserve the shape of the cement given by the sack. A few grams of sample at the surface were taken from a depth of about 1 mm and an area of about 20 cm×20 cm. This sample was labelled "surface." Having taken this sample, the rest of the contents of the sack were mixed by hand with a spatula to achieve a homogeneous powder. Cement in this state of mixing was labelled "bulk." The two samples were then submitted for water vapour adsorption measurements.

Common tests on mortar were conducted as per relevant standard, as follows:
Slump: Method based on adapted concrete standard NF EN 12350-2
Air content: NF EN 413-2
Setting time: NF EN 413-2
Compressive strength at 28 days: NF EN 196-1
Flexural strength at 28 days: NF EN 196-1.

Measurement of water vapour adsorption by cement during storage was carried out according to the following.

Water vapour adsorption on the cement grain has been measured using a RC612 multiphase carbon, hydrogen, and moisture analyser. This apparatus quantifies the carbon and hydrogen present in various organic and inorganic samples, and identifies the source of several types of carbon content. The apparatus features a furnace control system, which allows the temperature of the furnace to be programmed from near ambient to 1100° C.

Dependent upon the application, multiple furnace steps can be programmed by the operator and the furnace can be purged with oxygen or nitrogen to create oxidizing or inert conditions in which the carbon and hydrogen present is combusted or volatilized. A secondary oxidation catalyst is included to ensure full oxidation. Infrared detection is used to quantify the result either as a weight percentage or as a coating weight (mg/in$^2$).

When combusted in an oxidizing atmosphere ($O_2$) all forms of carbon (except some carbides such as SiC) are converted to $CO_2$. In contrast organic forms of carbon produce both $H_2O$ and $CO_2$. Thus, the presence of organic carbon may be verified by finding coincident peaks in $H_2O$ and $CO_2$.

Moisture and carbonate are detected when the sample is combusted in an inert ($N_2$) atmosphere, with the furnace catalyst temperatures at 120° C. In this mode, organic carbon normally is not detected. Additional sources of carbon can often be differentiated by the temperature at which they oxidize or volatilize.

A slow ramping temperature program, from 100° C. to 1000° C. at 20° C. per minute can be used for the analysis of unknown samples. This type of analysis can be used to indicate the temperatures at which the differing forms of carbon are oxidized, thereby enabling the operator to optimize the furnace temperature program to provide more rapid quantitative results for each form of carbon present in this sample type.

The method used specifically to obtain water vapour measurements for the example cited is summarised in table 7.

TABLE 7

| In $N_2$ atmosphere | Target temp (° C.) | Ramp (° C./min) | Stage in seconds | Duration |
|---|---|---|---|---|
| Hydrates step | 300 | | 300 | 300 |
| Portlandite step | 550 | 82 | 180 | 425 |
| Carbonate step | 950 | 120 | 180 | 525 |

The results of the ageing tests are shown in tables 8 and 9, below.

TABLE 8

Results of the ageing tests. In this control case, cement is contained in standard brown kraft valve sack, made of 2 paper plies of 70 g/m2 and a polyethylene barrier film in between.

| | Ageing period (external storage) in weeks | | | | |
|---|---|---|---|---|---|
| | 0 | 4 | 8 | 13 | 25 |
| Formulation | | | C | | |
| Valve sack mixed into formulation | | | None (Control) | | |
| Water vapour adsorbed - Bulk (%) | | 0.74 | 0.85 | 0.93 | 1.08 |
| Water vapour adsorbed - Surface (%) | | 0.81 | 0.84 | 0.89 | 1.34 |
| Slump (cm) | 14 | 18 | 20 | 19.5 | 19 |
| Air | 3 | 2.4 | 2.4 | 2.4 | 2.2 |
| Setting time (Start-finish, in minutes) | 195-270 | 210-330 | 225-333 | | 220-340 |
| Compressive strength at 28 days (MPa)* | 34.0 (3.88) | 34.8 (5.23) | 37.1 (3.63) | 31.1 (1.35) | 32.1 (3.74) |
| Flexural strength at 28 days (MPa) | 8.4 | 7.1 | 7.0 | 6.8 | 7.2 |

*Compressive and flexural strengths are given as averages. The values in brackets are standard deviations.

TABLE 9

Results of the ageing tests, Sack I.

| | Ageing period (external storage) in weeks | | | | |
|---|---|---|---|---|---|
| | 0 | 4 | 8 | 13 | 25 |
| Formulation | | | C | | |
| Valve sack mixed into formulation | | | Sack I | | |
| Water vapour adsorbed - Bulk (%) | | 0.76 | 0.86 | 1 | 1.23 |
| Water vapour adsorbed - Surface (%) | | 0.78 | 0.96 | 1.08 | 1.51 |
| Slump | 14 | 17 | 15 | 15 | 10 |
| Air | 3.1 | 3.3 | 4 | 3 | 2.6 |
| Setting time (Start-finish, in minutes) | 180-285 | 195-315 | 195-345 | 195-345 | 205-370 |
| Compressive strength at 28 days (MPa)* | 37.8 (3.69) | 37.2 (1.20) | 34.5 (3.32) | 37.7 (3.67) | 31.9 (6.78) |
| Flexural strength at 28 days (MPa) | 7.1 | 7.3 | 7.5 | 7.5 | 7.7 |

*Compressive and flexural strengths are given as averages. The values in brackets are standard deviations.

The water vapour adsorption, a marker of ageing as a major cause of the loss of reactivity of cement in storage, remains limited throughout the testing period for the disintegratable sack and close to the values measured for the standard case of brown kraft sack with 2 paper plies and a polyethylene barrier film. Slump values suggest that some slump is lost with time and would therefore require an adjustment, either with the addition of a judicious quantity of extra water or of a water-reducing admixture. Air is also increased somewhat but would be inconsequential in most common applications.

Setting time and compressive as well as flexural strength, taken as reliable indicators of cement reactivity show that during storage the cement contained in disintegratable sacks is essentially unchanged, especially in relation to the base case where cement is contained in standard brown kraft sacks.

The invention claimed is:

1. A method of making white sack paper having a grammage of 50-140 g/m² and a Gurley porosity, per ISO 5636/5, of 2-10 s, comprising the steps of:
   a) providing bleached pulp;
   b) subjecting the pulp to high consistency refining and optionally low consistency refining to the extent that the sack paper obtains the Gurley porosity;
   c) adding cationic starch to the pulp in an amount of 1.5-4 kg/ton paper; and
   d) adding size to the pulp in an amount of 0.4-2.0 kg/ton paper; and
   e) forming the sack paper from the pulp,
   wherein less than 0.5 kg/ton paper of anionic starch is added to the pulp.

2. The method according to claim 1, wherein step e) comprises crêping.

3. The method according to claim 1, wherein the method further comprises the steps of:
   f) applying a pre-coating composition onto the sack paper to form a pre-coating layer; and
   g) applying a barrier coating composition onto the pre-coating layer to form a barrier layer.

4. The method according to claim 1, wherein the pulp comprises bleached sulphate pulp.

5. A white sack paper having a grammage of 50-140 g/m² and a Gurley porosity, per ISO 5636/5, of 2-10 s formed from a bleached pulp to which:
   cationic starch was added in an amount of 1.5-4 kg/ton paper;
   size was added in an amount of 0.4-2.0 kg/ton paper; and
   less than 0.5 kg/ton paper of anionic starch was added,
   and which pulp was subjected to high consistency refining and optionally low consistency refining to the extent that the sack paper obtained the Gurley porosity.

6. The white sack paper according to claim 5, wherein the Gurley porosity is 4-10 s.

7. The white sack paper according to claim 5, wherein the Cobb 60 S value, per ISO 535, of at least one surface is least at least 50 g/m².

8. The white sack paper according to claim 5, wherein the tensile energy absorption index, per ISO 1924-3, is at least 1.8 J/g in both a machine direction and a cross direction.

9. A multilayered paper material for use in a valve sack for a hydraulic binder, comprising a paper layer composed of the white sack paper according to claim 5 and a moisture barrier coating layer.

10. The multilayered paper material according to claim 9, wherein a pre-coating layer comprising at least 50 wt. % of inorganic filler is provided between the paper layer and the moisture barrier coating layer.

11. A valve sack for a hydraulic binder, comprising a ply composed of the multilayered paper material according to claim 9.

12. A valve sack for a hydraulic binder, comprising a ply composed of the white sack paper according to claim 5.

13. A multiple-ply valve sack for a hydraulic binder, comprising an inner ply composed of sack paper according to claim 5.

14. The multiple-ply valve sack of claim 13, further comprising an outer ply having a moisture barrier coating layer.

15. The white sack paper according to claim 5, wherein the pulp comprises bleached sulphate pulp.

* * * * *